United States Patent [19]

Earnhart

[11] Patent Number: 5,003,333
[45] Date of Patent: Mar. 26, 1991

[54] PULSE GENERATING MECHANISM FOR A WEB-ROLL

[75] Inventor: Edgar G. Earnhart, Hilton, N.Y.
[73] Assignee: Eastman Kodak Company, Rochester, N.Y.
[21] Appl. No.: 505,963
[22] Filed: Apr. 9, 1990
[51] Int. Cl.⁵ .............................................. G03B 1/60
[52] U.S. Cl. ................................................... 354/218
[58] Field of Search .................. 354/218; 33/732, 733; 377/24

[56] References Cited

U.S. PATENT DOCUMENTS

| 4,758,851 | 7/1988 | Zeth | 354/218 |
| 4,918,485 | 4/1990 | Ishii et al. | 354/218 |

Primary Examiner—L. T. Hix
Assistant Examiner—Jae N. Noh
Attorney, Agent, or Firm—William C. Dixon

[57] ABSTRACT

A pulse generating mechanism, for a photosensitive web-roll mounted for rotation within a light-tight cartridge, comprises a flange on the web-roll; a plurality of activating means on the flange that are equally spaced angularly from each other and radially from the flange center; and sensing means disposed outside the cartridge for sensing movement of each activating means therepast, upon incremental rotation of the flange and web-roll, and for generating pulses in response to said sensing for monitoring quantity of web remaining on the web-roll. Each activating means preferably comprises a ferromagnetic or electrically conductive element on the flange, and the sensing means preferably comprises a transducer for sensing presence of that element. The element can be a ferromagnetic or electrically conductive disc affixed to the flange or spaced bosses on a flange made of ferromagnetic or electrically conductive material.

17 Claims, 3 Drawing Sheets

PULSE GENERATING MECHANISM FOR A WEB-ROLL

BACKGROUND OF THE INVENTION

1. Field of the Invention

The present invention relates generally to photographic cartridges, and more particularly to a pulse generating mechanism for a web-roll mounted for rotation within a cartridge.

2. Description of the Prior Art

Sensing mechanisms for sensing web rotation, or web transport, are well known in the prior art, as indicated in U.S. Pat. Nos. 3,564,219, 3,730,453, 3,779,483, 3,917,142, 3,949,856, and 4,153,361.

Most of those patents utilize some type of sensing mechanism wherein pulses are generated for indicating a rotational velocity of the web-spool. The pulses are fed to a counter, where they are accumulated, stored, and displayed to indicate the amount of web material remaining on the spool.

One problem with prior-art sensing mechanisms, including pulse generating portions thereof, is that, mechanically, they are of relatively complicated construction, which adversely affects the reliability and cost of such mechanisms. One disadvantage of those mechanisms is that the web-roll cartridge normally interfaces with a printer or the like, and the sensing and pulse generating mechanisms are normally mounted in the interfacing structure and not within the cartridge. That necessitates a larger and more complicated interfacing structure. Another disadvantage of prior-art sensing and pulse generating mechanisms is that most of them are designed to deal with cartridges that handle web material which is insensitive to light. Such mechanisms, particularly the pulse generating portion thereof, could not be incorporated into apparatus having cartridges containing photosensitive web material without exposing the web material and thus making the apparatus inoperative. Prior-art sensing mechanisms that are capable of handling photosensitive web material and generating pulses for some specified purpose without exposing the web material, such as those mechanisms disclosed in the above-cited U.S. Pat. No. 4,153,361, are wholly located outside the cartridge, thereby suffering from the disadvantage first mentioned above. The pulse generating mechanism of this invention is believed to eliminate those and other disadvantages of the known prior art.

SUMMARY OF THE INVENTION

An object of the present invention is to provide a pulse generating mechanism for a photosensitive web-roll mounted for rotation within a light-tight cartridge. The pulse generating mechanism of this invention comprises a flange on a web-roll, activating means angularly spaced on the flange, and sensing means outside the cartridge for sensing the activating means upon incremental rotation of the flange and web-roll. In response to such sensing, pulses are generated for use in monitoring the amount of web remaining on the web-spool.

According to one feature of this invention, the activating means on the flange comprises either ferromagnetic elements detectable by a magnetic sensor or electrically conductive elements detectable by a proximity sensor.

In accordance with another feature of this invention, the flange has a plurality of angularly spaced bosses, each one having a flat circular top surface, and the ferromagnetic or electrically conductive elements comprise metallic elements mounted on the bosses.

According to a more specific feature of this invention, the flange has an outer side surface, and the cartridge has a sidewall with inner and outer sidewall surfaces, the flange outer side surface being parallel to and closely spaced from the inner sidewall surface. The activating means on the flange comprises electrically conductive elements, and the sensing means is mounted adjacent to the outer sidewall surface in a position of alignment with each electrically conductive element as it moves therepast.

In accordance with still another feature of this invention, the flange is formed of ferromagnetic material and includes angularly spaced bosses of such material. The activating means comprises the magnetic field of each ferromagnetic boss as it passes in close proximity to an externally mounted magnetic detector.

The invention, and its objects and advantages, will become more apparent from the detailed description of the preferred embodiments presented below.

BRIEF DESCRIPTION OF THE DRAWINGS

In the detailed description of the preferred embodiments of this invention presented below, reference is made to the accompanying drawings, in which.

DESCRIPTION OF THE PREFERRED EMBODIMENTS

Because certain parts of photographic cartridges and interfacing apparatus are well known, the following description is directed in particular to those elements forming, cooperating directly with, or relating to the present invention. Elements not specifically shown or described herein are selectable from those known in the pertinent art.

Figure 1:
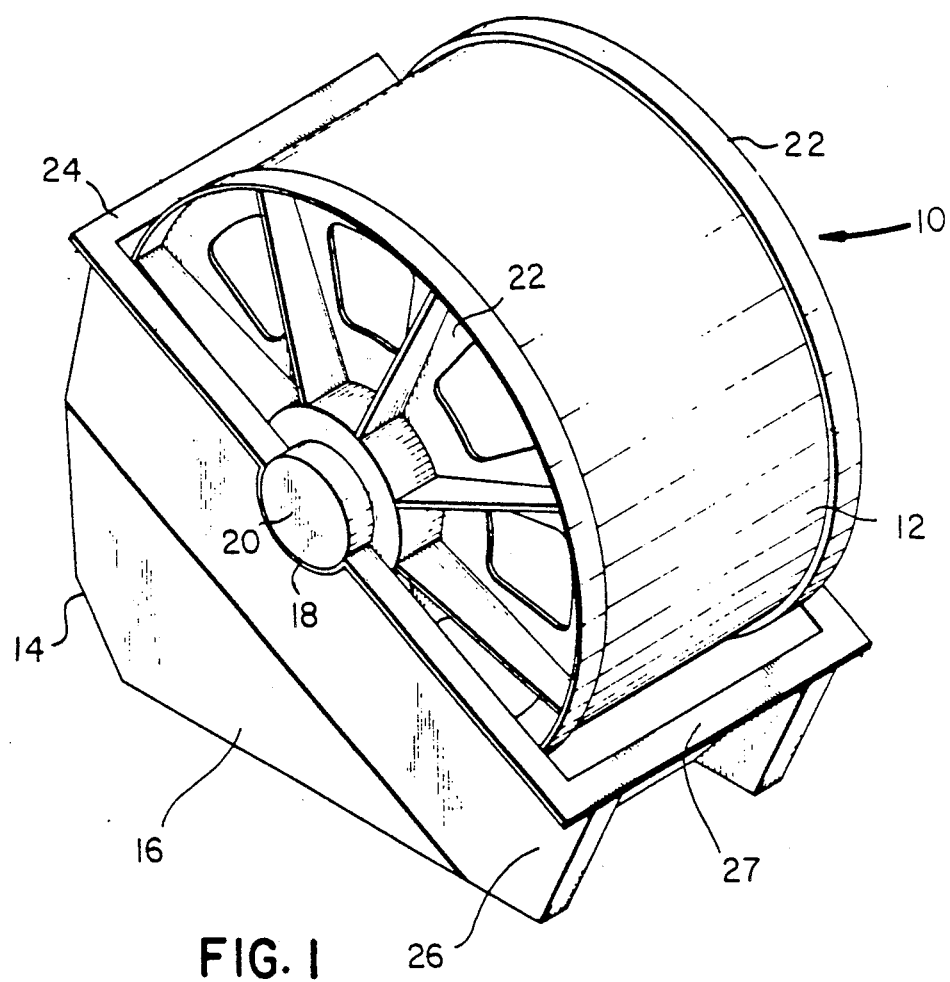
FIG. 1 is a perspective view of a cartridge of the type in which a preferred embodiment of the pulse generating mechanism of this invention may be incorporated, wherein one housing portion is removed to expose a web-roll wound on a web-spool.

Illustrated in FIG. 1 is a light-tight cartridge 10 of a type suitable for supplying a computer output microfilmer or the like, not shown, with long web-rolls 12 of web material, such as 105 mm-wide film. The cartridge 10 typically comprises a pair of cartridge housings 14, only one of which is shown in FIG. 1, having sidewalls 16 provided with matching semicircular journals 18 for rotatably supporting cylindrical bearings 20 on a pair of identical flanges 22 on the web-roll. The cartridge housings 14 are sealed together along mating rims 24, only one of which is shown, for enclosing the web-roll. The housings 14 normally define a nose portion 26, only one of which is shown, provided with opposed inner surfaces 27, only one of which is shown, defining an exit slot through which the web is withdrawn. Plush or foam material strips, not shown, are normally applied to the surfaces 27 to prevent light from entering the cartridge interior.

The web-roll 12 comprises a web-spool onto which a long web of film or paper is wound. The web-spool comprises a cylindrical core, not shown, to which the pair of identical flanges 22 are attached or secured. Generally, for the type of cartridge herein described, the web is initially wound onto the core, the flanges are attached to the core ends to form a web-roll, the web-roll is placed in one cartridge housing, and the other cartridge housing is then secured thereto for enclosing the web-roll.

Figure 2:
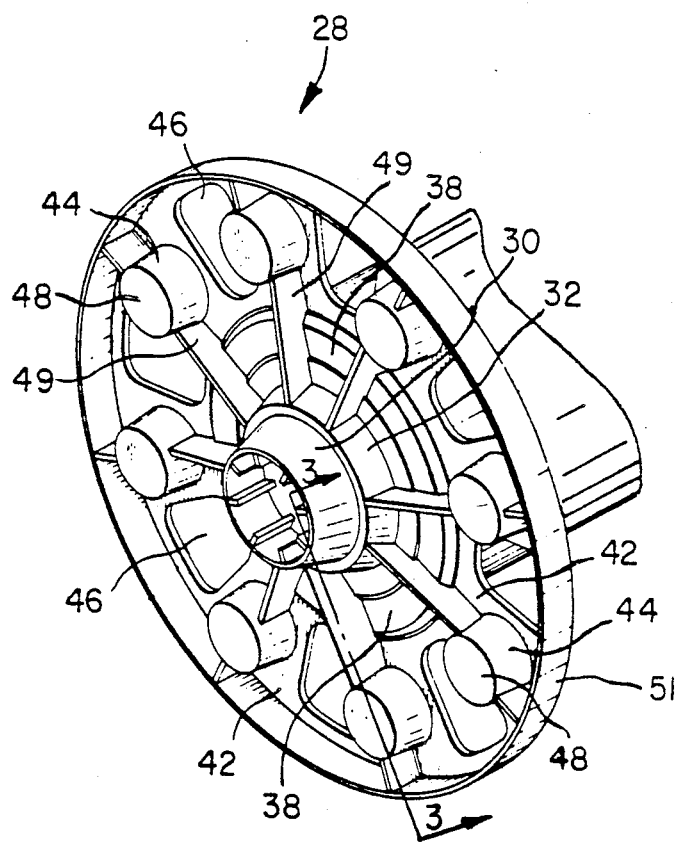
FIG. 2 is a front perspective view of a web-roll flange comprising one of the elements of this invention with its foil disc omitted.
Figure 3:
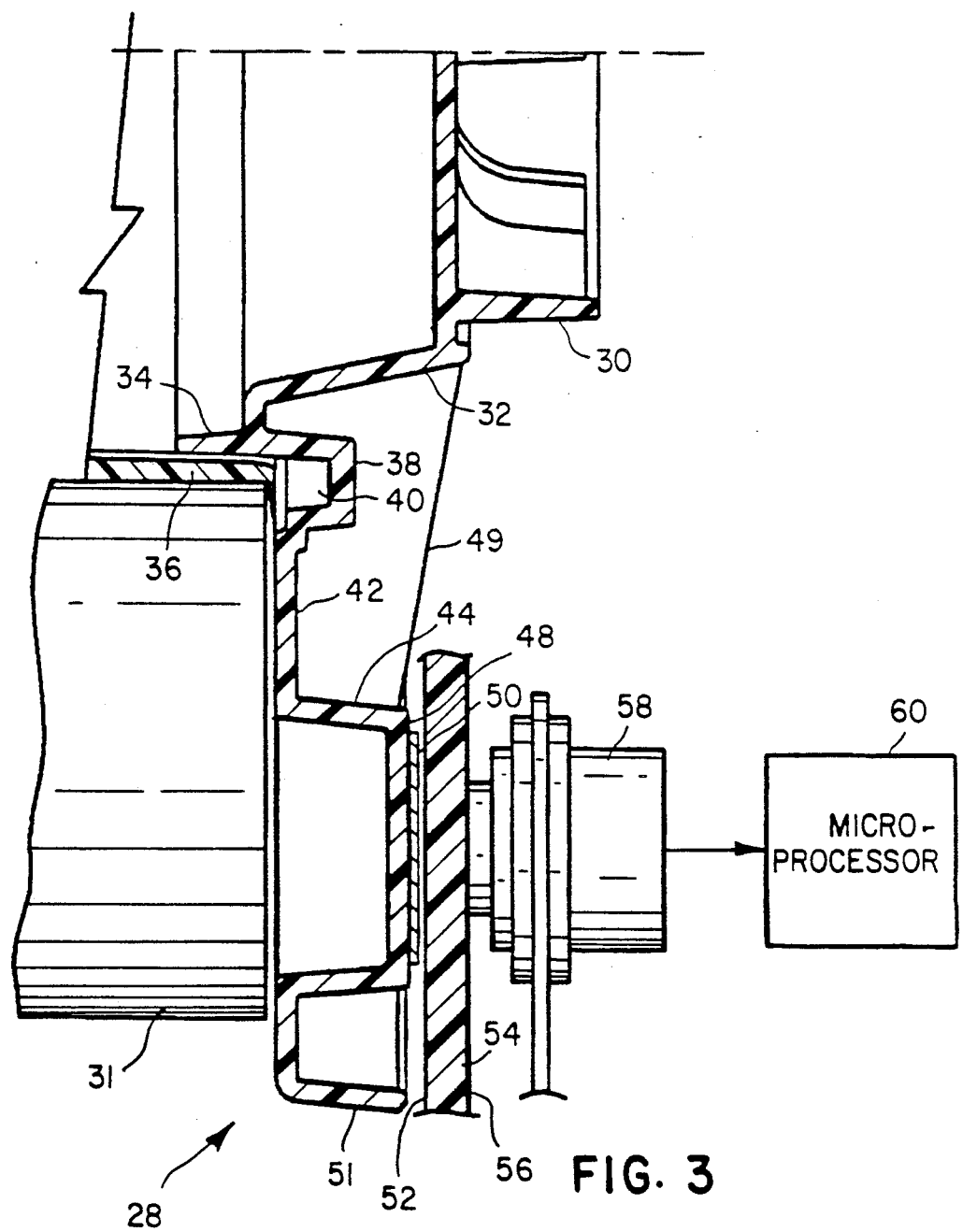
FIG. 3 is a sectional view, taken substantially along line 3—3 of FIG. 2, with a segment of the web-roll, cartridge sidewall, metallic element, and sensing means added thereto.

With reference to FIGS. 2 and 3, each flange 28 of a pair of flanges on a web-spool comprises a circular molded-plastic member having a cylindrical hub 30 which forms a bearing for rotatably supporting the flange and a web-roll 31 in the cartridge. The flange 28 has a frusto-conical connecting element 32 with one edge thereof connected to a cylindrical guide 34 for a core end 36 and a wall 38 defining a core-end-receiving cavity 40. The wall 38 is further connected to an annular plate-like member, or plate, 42 for constraining one edge of the web-roll 31. The plate 42 is provided with a plurality of circular projecting bosses 44 radially equally spaced from the center of the flange. A plurality of openings 46 extend through portions of the plate 42 between the bosses 44. Each boss 44 has a flat circular top surface 48, all lying in the same plane, to which a metallic element 50 of foil material or the like is attached by any suitable means, such as adhesive. Alternatively, the metallic element 50 can be omitted and the entire flange 28 with the openings 46 therein, or at least the annular plate 42 thereof, could be molded or formed of a ferromagnetic material, or ferromagnetic filled plastic. The flange 28 further has a plurality of radially extending support ribs 49 and a peripheral lip 51.

With specific reference to FIG. 3, the flange 28 is constructed so that the flat circular top surface 48 of each boss 44 is as close as possible to an inner surface 52 of a cartridge sidewall 54. Secured adjacent to the outer surface 56 of sidewall 54, in a position of alignment with the center of each boss 44 as it moves therepast during rotation of the flange, is any suitable transducer 58, which is capable of generating a pulse when a metallic element 50 or ferromagentic boss passes in front of the transducer upon intermittent rotation of the web-roll 31 as the web is withdrawn therefrom. The pulses generated by transducer 58 preferably are fed into the memory logic of a microprocessor 60. When a predetermined number of pulses are accumulated in the logic system, which may indicate, for example, the amount of web remaining on the web-roll, the microprocessor actuates any suitable light, sound, or other indicating mechanism, not shown, for indicating to the operator that the web-roll 31 will soon expire.

The invention has been described in detail with particular reference to preferred embodiments thereof, but it will be understood that variations and modifications can be effected within the spirit and scope of the invention.

I claim:

1. A pulse generating mechanism for a photosensitive web-roll mounted within a light-tight cartridge for rotation about a rotational axis upon withdrawal of web material therefrom, said mechanism comprising:

a flange on the web-roll for constraining the web, said flange having a center coincident with said rotational axis;

a plurality of activating means on said flange, said activating means being angularly equally spaced from each other and radially equally spaced from said flange center; and sensing means outside the cartridge for sensing movement of each activating means therepast upon incremental rotation of said flange and web-roll about said rotational axis and for generating pulses in response to said sensing for monitoring quantity of web material remaining on the web-roll.

2. A pulse generating mechanism as claimed in claim 1 wherein said plurality of activating means includes a like plurality of ferromagnetic elements.

3. A pulse generating mechanism as claimed in claim 2 wherein said plurality of activating means further includes a like plurality of bosses respectively supporting said ferromagnetic elements.

4. A pulse generating mechanism as claimed in claim 3 wherein said bosses respectively have flat top surfaces lying in a common plane and supporting said ferromagnetic elements.

5. A pulse generating mechanism as claimed in claim 2 wherein said flange is formed from a ferromagnetic material; and wherein said plurality of activating means further includes a like plurality of bosses of such material respectively composing said ferromagnetic elements.

6. A pulse generating mechanism as claimed in claim 5 wherein said bosses respectively have flat top surfaces presenting said ferromagnetic elements in a common plane.

7. A pulse generating mechanism as claimed in claim 1 wherein said plurality of activating means includes a like plurality of electrically conductive elements.

8. A pulse generating mechanism as claimed in claim 7 wherein said plurality of activating means further includes a like plurality of bosses respectively supporting said electrically conductive elements.

9. A pulse generating mechanism as claimed in claim 8 wherein said bosses respectively have flat top surfaces lying in a common plane and supporting said electrically conductive elements.

10. A pulse generating mechanism as claimed in claim 1 wherein the cartridge has an outer sidewall with inner and outer surfaces; wherein said flange has an outer side surface disposed in parallel, closely spaced relation to the sidewall inner surface; wherein said plurality of activating means includes a like plurality of ferromagnetic elements; and wherein said sensing means is mounted adjacent to the sidewall outer surface.

11. A pulse generating mechanism as claimed in claim 10 wherein said plurality of activating means further includes a like plurality of bosses respectively having flat top surfaces lying in a common plane and supporting said ferromagnetic elements.

12. A pulse generating mechanism as claimed in claim 10 wherein said flange is formed from a ferromagnetic material; and wherein said plurality of activating means further includes a like plurality of bosses of such material respectively having flat top surfaces that lie in a common plane and compose said ferromagnetic elements.

13. A pulse generating mechanism as claimed in claim 1 wherein the cartridge has an outer sidewall with inner and outer surfaces; wherein said flange has an outer side surface disposed in parallel, closely spaced relation to the sidewall inner surface; wherein said plurality of activating means includes a like plurality of electrically conductive elements; and wherein said sensing means is mounted adjacent to the sidewall outer surface.

14. A pulse generating mechanism as claimed in claim 10 wherein said plurality of activating means further includes a like plurality of bosses respectively having flat top surfaces lying in a common plane and supporting said electrically conductive elements.

15. A pulse generating mechanism for a photosensitive web-roll mounted within a light-tight cartridge for rotation about a rotational axis upon withdrawal of web material therefrom, said mechanism comprising:
   a flange on the web-roll for constraining the web, said flange being molded from a ferromagnetic filled plastic and having a center coincident with said rotational axis;
   a plurality of activating means including a like plurality of ferromagnetic elements on said flange, said activating means further including a like plurality of bosses of such plastic respectively composing said ferromagnetic elements, said bosses being angularly equally spaced from each other and radially equally spaced from said flange center; and
   sensing means outside the cartridge for sensing movement of each boss therepast upon incremental rotation of said flange and web-roll about said rotational axis and for generating pulses in response to said sensing for monitoring quantity of web material remaining on the web-roll.

16. A pulse generating mechanism as claimed in claim 15 wherein said bosses respectively have flat top surfaces presenting said ferromagnetic elements in a common plane.

17. A pulse generating mechanism for a photosensitive web-roll mounted within a light-tight cartridge for rotation about a rotational axis upon withdrawal of web material therefrom, said cartridge having an outer sidewall with inner and outer surfaces, said mechanism comprising:
   a flange on the web-roll for constraining the web, said flange being molded from a ferromagnetic filled plastic and having an outer side surface disposed in substantially parallel, closely spaced relation to the sidewall inner surface, and further having a center coincident with said rotational axis;
   a plurality of activating means including a like plurality of ferromagnetic elements on said flange, said activating means further including a like plurality of bosses of such plastic respectively having flat top surfaces that lie in a common plane and compose said ferromagnetic elements, said bosses being angularly equally spaced from each other and radially equally spaced from said flange center; and
   sensing means outside the cartridge mounted adjacent to the sidewall outer surface for sensing movement of each boss therepast upon incremental rotation of said flange and web-roll about said rotational axis and for generating pulses in response to said sensing for monitoring quantity of web material remaining on the web-roll.

* * * * *

Notice of Adverse Decisions in Interference

In Interference No. 102,787, involving Patent No. 5,003,333, E. G. Earnhart, PULSE-GENERATING MECHANISM FOR A WEB-ROLL, final judgment adverse to the patentees was rendered Mar. 24, 1992, as to claims 1-17.

*(Official Gazette August 25, 1992.)*